Nov. 18, 1924. 1,516,029

T. J. STURTEVANT

APPARATUS FOR USE IN MANUFACTURING MORTAR OR PLASTER

Filed March 5, 1923  3 Sheets-Sheet 1

INVENTOR:
Thomas J. Sturtevant
BY Henry T. Williams,
ATTORNEY

Nov. 18, 1924.                                                                1,516,029
T. J. STURTEVANT
APPARATUS FOR USE IN MANUFACTURING MORTAR OR PLASTER
Filed March 5, 1923                         3 Sheets-Sheet 2
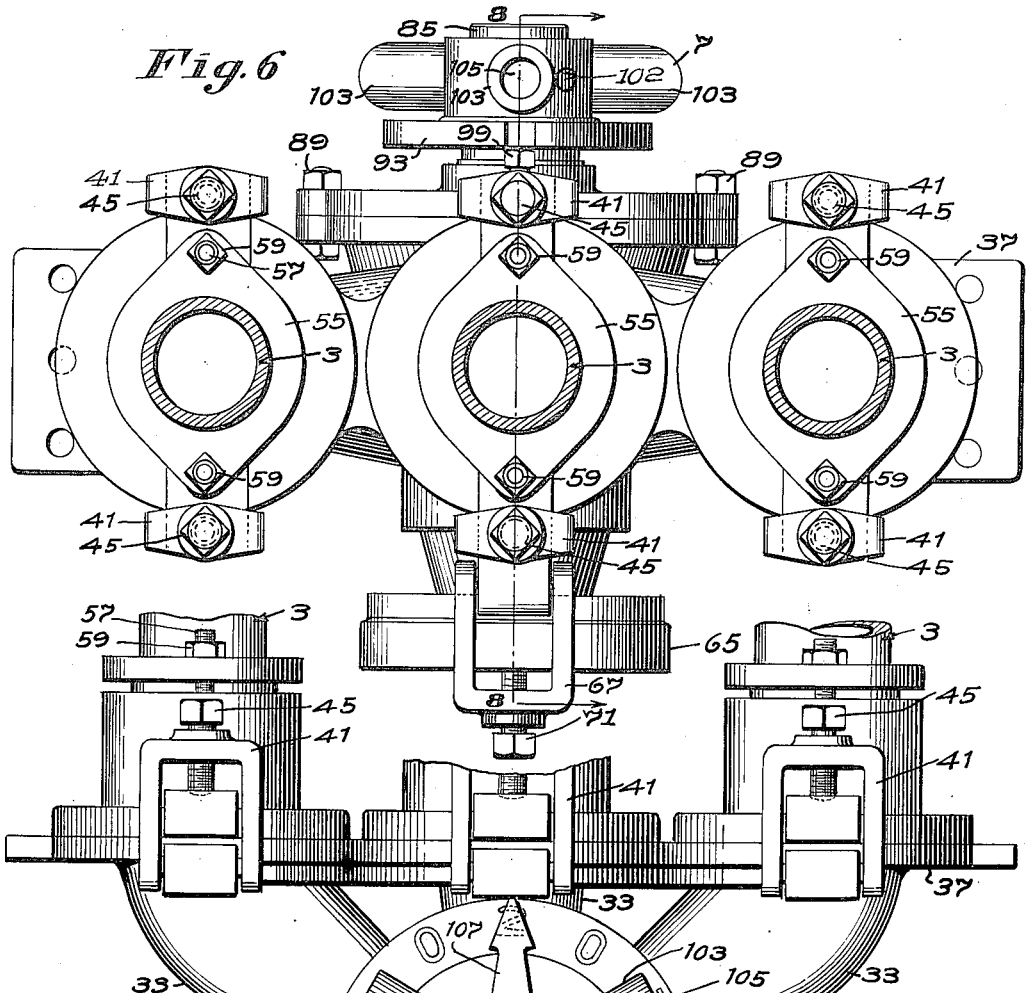
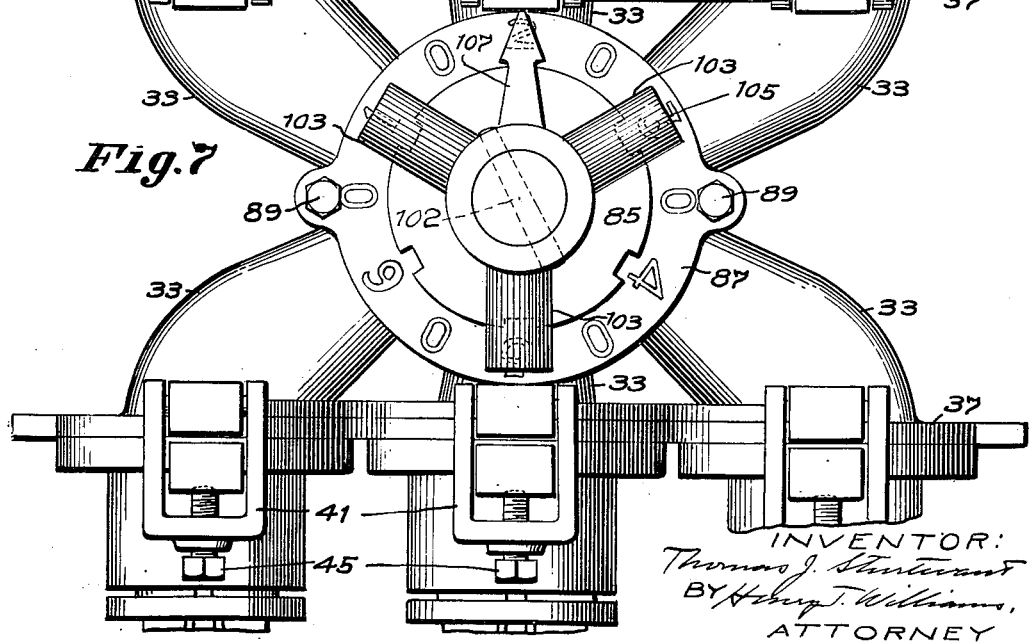
INVENTOR:
Thomas J. Sturtevant
BY Henry T. Williams,
ATTORNEY

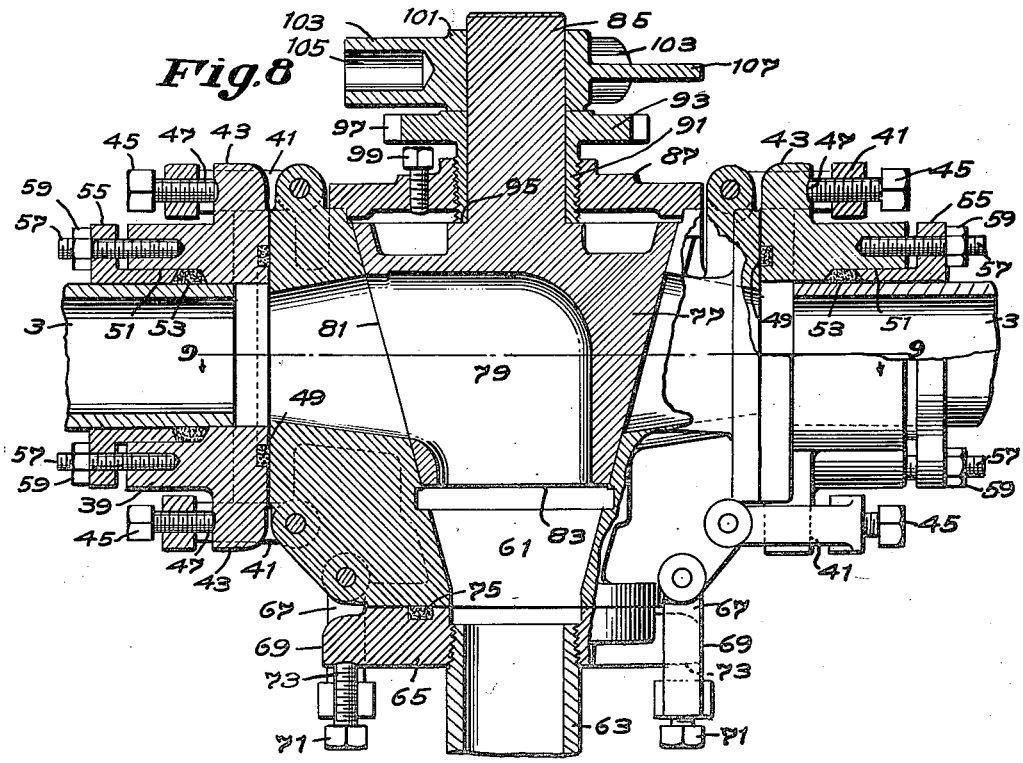
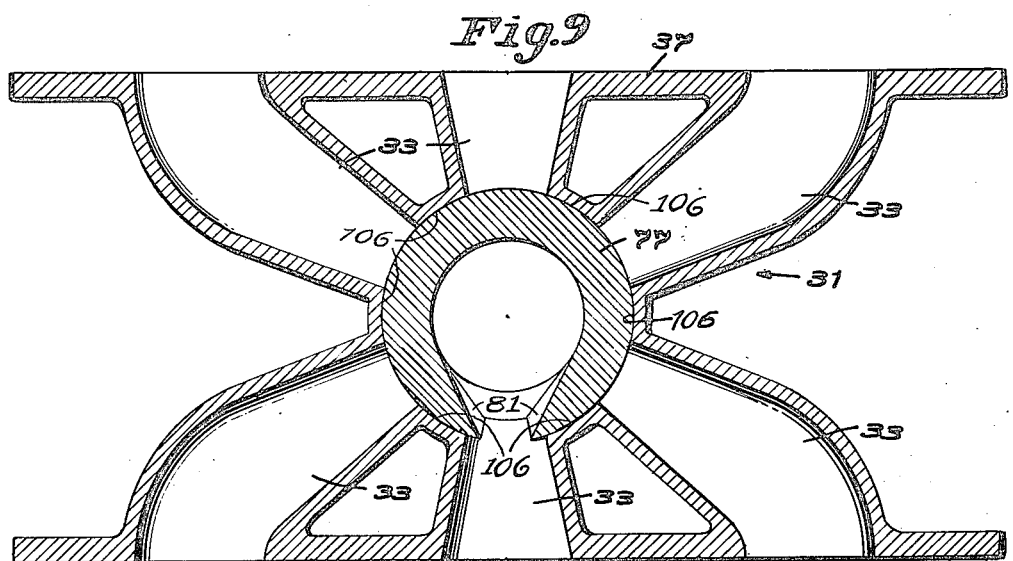

Patented Nov. 18, 1924.

1,516,029

UNITED STATES PATENT OFFICE.

THOMAS J. STURTEVANT, OF WELLESLEY, MASSACHUSETTS, ASSIGNOR TO STURTEVANT MILL COMPANY, OF BOSTON, MASSACHUSETTS, A CORPORATION OF MASSACHUSETTS.

APPARATUS FOR USE IN MANUFACTURING MORTAR OR PLASTER.

Application filed March 5, 1923. Serial No. 623,070.

*To all whom it may concern:*

Be it known that I, THOMAS J. STURTEVANT, a citizen of the United States, residing at Wellesley, in the county of Norfolk and State of Massachusetts, have invented certain new and useful Improvements in Apparatus for Use in Manufacturing Mortar or Plaster, of which the following is a specification.

The invention to be hereinafter described relates to apparatus for use in the manufacture of mortar and plaster.

In making mortar and plaster on a commercial scale in a factory, water is added to lime to slake the same, and after these ingredients are thoroughly mixed, the slaked lime is delivered to a vat or vats and allowed to stand a sufficient length of time properly to age the same. Then the aged slaked lime is delivered to apparatus in which sand is added thereto, and these ingredients are thoroughly mixed for the production of mortar. The mortar is manufactured on a large scale in sufficient amount, so that it may be in readiness for delivery and use on jobs as required. This eliminates the necessity of making the mortar on the job, and enables a better product to be produced with economy in manufacture.

Heretofore, crude means has been employed for conducting the aged slaked lime from the curing vats to the mortar mixing apparatus. The aim and purpose of the present invention, therefore, is to provide improved means whereby the aged slaked lime may be effectively delivered from the vats to the mortar mixing apparatus, and to provide means whereby the delivery from the vats may be readily controlled.

In carrying the invention into practical effect, in the present instance, the vats are provided with discharge pipes communicating therewith, and leading to a pipe union or valve body, to which is connected a delivery pipe which is common to and serves to receive the aged lime paste from each of the vat discharge pipes, and to conduct the paste to the mortar mixing apparatus. A valve is provided in the pipe union which may be adjusted so that it may place any one of the vat discharge pipes in communication with the common discharge pipe, and at the same time prevent communication of the other vat discharge pipes with the common delivery pipe. Also said valve may be adjusted to close all of the discharge pipes.

The aged lime paste is in the form of a thick, sluggish mud which is liable to clog the vat discharge pipes. A purpose of the invention is to construct said pipes in sections, and provide means for detachably connecting the sections, the construction being such that any clogged or obstructed section may be quickly and easily removed, thereby to facilitate cleaning the same.

The character of the invention may be best understood by reference to the following description of one good form thereof shown in the accompanying drawings, wherein.

Figure 1:
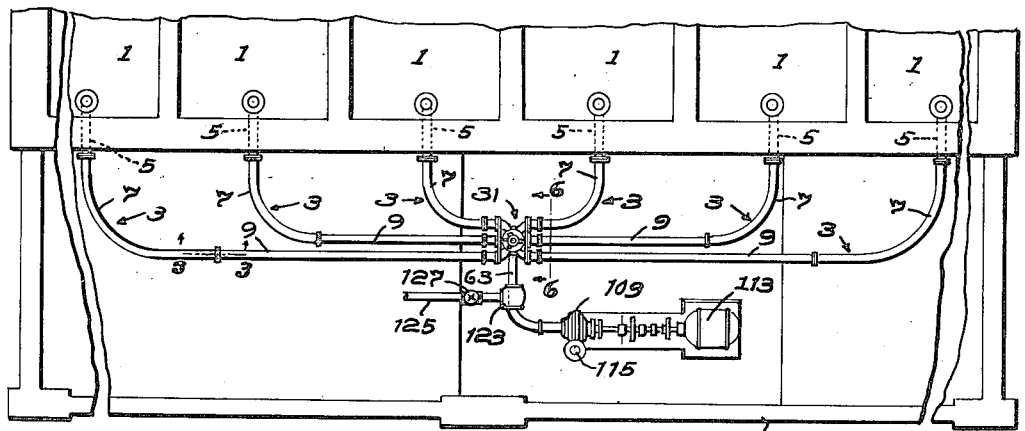
Fig. 1 is a plan view showing portions of a plurality of curing or aging vats, the system of piping leading from said vats, a pump for producing the suction for drawing the aged lime putty from the vats, and an electric motor for driving the pump.
Figures 3, 4, 5:
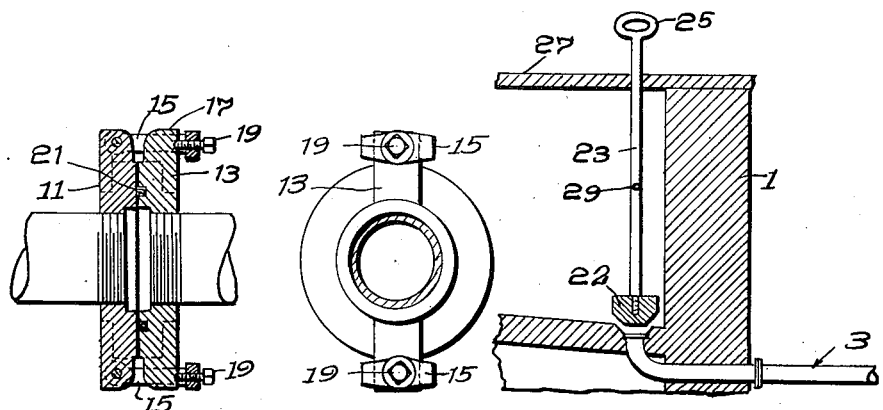

Fig. 3 on an enlarged scale is a section taken on line 3—3 of Fig. 1;

Fig. 4 is an end view of the construction shown in Fig. 3;

Fig. 5 is a vertical section through a portion of one of the vats, and illustrates a portion of the discharge pipe leading from the vat, and shows a valve for controlling the discharge from the vat;

Fig. 6 on an enlarged scale is a vertical section taken on line 6—6 of Fig. 1;

Fig. 7 is a plan of the construction shown in Fig. 6;

Fig. 8 is a vertical section taken on line 8—8 of Fig. 6; and

Fig. 9 is a horizontal section taken on line 9—9 of Fig. 8.

Referring to the drawings, the apparatus shown therein as one good form of the invention, comprises a plurality of curing vats 1 which may be formed of concrete, and may desirably be six in number, corresponding to the working days in the week.

It is desirable violently to agitate, beat, churn, or whip the aged lime paste in each vat to improve the consistency, smoothness, lightness, increase the bulk of the product, and to facilitate delivery of the paste from the vat. Suitable agitating apparatus may be employed for this purpose, such, for example, as the apparatus disclosed in my copending application Serial No. 619,815, filed February 19, 1923.

The provision of the several vats permits the lime paste to be delivered from the slaking apparatus to one of the vats, permits the paste to age in another vat, permits the lime paste to be agitated in another vat, and permits the aged lime paste to be delivered from still another vat, these operations being carried on in rotation, so that aged lime paste may always be in readiness for delivery to the mortar mixing apparatus.

Each of the curing vats may be provided with a discharge pipe 3 which may be formed of sections 5, 7 and 9, with the exception of the discharge pipes for the two innermost vats, each of which has two sections 5 and 7. To enable ready removal of sections, suitable means may be provided for detachably connecting the same. This means, in the present instance, comprises flanges 11 and 13 (Figs. 3 and 4) which may be threaded on adjacent ends of the pipe sections. Pivotally connected to the flange 11 are a pair of yokes 15 adapted to straddle ears 17 on the flange 13, said yokes being provided with screw bolts 19 adapted to bear against the ears 17. The construction is such that in assembling the pipe sections, the yokes may be rocked to the positions shown in Fig. 3, and then the screw bolts may be tightened, thereby to press the pipe flanges 11 and 13 into tight engagement with each other. One of the flanges may be provided with a groove in which is seated a packing ring 21, thereby to prevent any possibility of leakage between the flanges. When it is desired to remove a pipe section, it is merely necessary to release the screw bolts and swing the yokes away from the ears 17. Then the pipe section thus released may be moved out of registration with the pipe sections adjacent thereto, and the removed pipe section may be readily cleared of material and cleaned.

To control the discharge of the aged lime paste from the vats, each of the latter may be provided with a valve 22 (Fig. 5) secured to the lower end of a rod 23 which projects upward above the top of the vat and is provided with a handle 25 conveniently accessible to the operator when standing on a platform 27 at the top of the vat. The rod 23 may pass through a hole in the platform, and said rod may be provided with a pin 29 adapted to engage the under face of the platform so as to limit the upward movement of the valve rod.

Each of the vat discharge pipes 3 leads to a central point where there is located a pipe union or valve body 31 formed to present short tubes 33 which lead from a central conical chamber 35 to opposed plates 37. In the present instance, six such tubes are provided corresponding in number to the six vat discharge pipes.

Suitable means may be provided detachably to connect the vat discharge pipes with the plates 37 of the union, in positions such that the pipes will properly register with the short tubes 33. The means for connecting each of the pipes to the union, in the present instance, comprises a flange 39 (Figs. 6, 7 and 8) having a smooth bore corresponding to the external diameter of the pipe. A pair of yokes 41 are pivotally connected to ears projecting from the union. These yokes straddle ears 43 projecting from the flange, and threaded into said yokes are screw bolts 45 adapted to seat against depressions 47 in a face of the flange. To prevent leakage between the flange and the union plate 37, the former may be provided with a groove adapted to receive a packing ring 49. To prevent leakage between the pipe and the flange, the latter may have a counterbore 51 receiving suitable packing 53 confined by a gland 55 secured to the flange by screws 57 held by lock nuts 59.

The construction is such that the pipes may be easily and quickly connected to the union, or dis-connected therefrom, and expansion joints are provided which will compensate for any slight differences in the dimensions of the pipes, and will thereby insure proper assembly of the pipes with the union.

In the lower portion of the union is a port 61 (Fig. 8) having its axis perpendicular to the plane of the vat discharge pipes 3, said port constituting a continuation of the tapered chamber 35 referred to.

To conduct the lime paste from the union, a delivery pipe 63 may be provided. Threaded to the upper end of the delivery pipe is a flange 65 detachably connected to the union by yokes 67 pivoted to the union and straddling ears 69 projecting from the flange. Screw bolts 71 are threaded into the yoke, and are adapted to seat in depressions 73 in the flange. To prevent leakage between the union and the flange 65, the latter may have a groove adapted to receive a packing ring 75. The construction is such that the delivery pipe flange may be quickly and easily connected to the union, or dis-connected therefrom, as desired.

Fitted in the conical chamber 35 of the valve body, is a conical valve plug 77 provided with an L-shaped passage 79 having an inlet 81 adapted for registration with any one of the union tubes 33, and having an outlet 83 registering with the port 61 leading to the delivery pipe 63.

The plug valve 77 has a stem 85 projecting upward through a bore in a cover 87 secured to the union by screw bolts 89 (Fig. 7). To adjust the plug valve so as to have proper fit in the conical chamber 35, the bore in the cover 87 is made somewhat larger than the diameter of the valve stem 85, thereby admitting a sleeve 91 of an adjusting nut 93, said sleeve being threaded in the bore of the cover. The inner end of the sleeve is adapted to engage a circumferential shoulder 95 on the plug valve. The periphery of the adjusting nut 93 may have notches 97 formed therein to enable application of a spanner wrench to the nut for the purpose of adjusting the same. The nut may be secured in its different positions of adjustment by frictional engagement therewith of the head of a screw bolt 99 threaded in a hole in the cover.

A boss 101 may be fitted on the valve stem 85 and be secured thereto by a pin 102. Projecting radially from said boss are three arms 103 (Figs. 7 and 8) having sockets 105 in which a bar may be inserted to facilitate rotative adjustment of the valve, so as to bring the inlet 81 of the valve passage 79 into registration with any one of the vat discharge pipes, or to bring the inlet 81 opposite portions 106 of the union between the tubes 33, thereby to close all of the vat pipes.

If the valve should stick in its chamber, the nut 93 may be adjusted to press up on the boss 101 and thereby slightly lift the valve so as to release the same and enable rotative adjustment thereof.

To indicate the positions of adjustment of the valve, the boss 101 may be provided with an indicator 107 adapted to register with a dial on the cover 87 marked with numbers 1 to 6, located on the cover in positions corresponding to the centers of the mouths of the union tubes 33 opening into the chamber 35. Said dial may also be marked with the character "O" indicating the non-discharge position of the valve. The construction is such that the operator may readily know the proper degree of rotative adjustment to impart to the valve, in order to effect delivery of the lime paste from the desired vat discharge pipe or to prevent delivery from all of said pipes.

Figure 2:
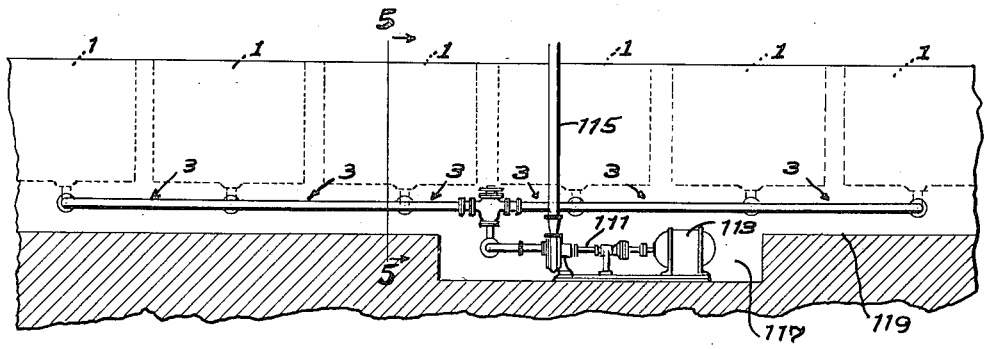
Fig. 2 is a side elevation of construction shown in Fig. 1.

It is desirable to establish suction in the delivery pipe 63 in effecting the discharge of the paste from the vats. To accomplish this, in the present instance, the delivery pipe is connected to a rotary suction pump 109 (Figs. 1 and 2) driven by shafting 111 from an electric motor 113. Since this rotary pump is of usual well known construction, it is unnecessary to show and describe the same in detail herein. The pump may deliver the paste therefrom through an upstanding pipe 115 to the mortar mixing apparatus, or other point desired.

The pump and the electric motor may be mounted in a chamber 117 which is beneath the level of the floor 119 of the house 121 for the vats.

To facilitate flushing of the vat discharge pipes, the delivery pipe 63 may be provided with a union 123 connected with a pipe 125 adapted to receive water from the city main, said pipe 125 being provided with a suitable valve 127. The construction is such that when the valve 127 is opened, water may be delivered to the union, and under the control of the plug valve therein, the water may be delivered to any one of the vat discharge pipes to clean the same. This construction also provides convenient means for adding water to the lime paste in any of the vats prior to agitating the same.

In establishing suction in the delivery pipe, it may be desirable to prime the pump with water. This may be readily accomplished by adjusting the valve 77 to a position to close all of the tubes 33. Then on opening of the valve 127, water may be delivered from the city main through the delivery pipe to the pump, and enable establishing the suction. Thereupon, the valve 77 may be opened to establish communication between one of the vat discharge pipes and the delivery pipe, and when sufficient suction has been produced to start to draw the lime past from the vat, the valve 127 may be closed.

If it is desired to flush out the pipe 115 through which the lime paste is forced by the pump, the valve 77 may be adjusted to close all of the tubes 33, and the valve 127 may be opened. Then operation of the pump will deliver water from the pipe 125 through the pipe 115 and clean the same.

In operation, when it is desired to discharge the lime paste from any one of the vats, the valve 22 therefor is opened, and the plug valve is rotatively adjusted to bring the inlet 81 of its passage 79 into registration with the pipe leading from said vat. Thereupon, the rotary pump will draw the paste from the vat discharge pipe through the union and through the delivery pipe, and force the paste upward through the upright pipe 115.

If any of the vat discharge pipes becomes so clogged or obstructed that it is necessary to remove one of the sections thereof, this may be readily accomplished as described. Usually it will suffice to remove the curved pipe sections, and this will afford sufficient access not only to the curved section, but to the other sections of the discharge pipe to enable ready cleaning thereof.

When the lime paste is discharging from one of the vats the valves 22 at the entrance ends of the discharge pipes of all of the other vats remain closed so as to prevent the lime paste from flowing down into the discharge pipes. This is important since if the lime paste is allowed to stand in the pipes, it is liable to become so hard that it will be difficult to remove the same from the pipes. It will be understood that the valves 22 are closed promptly after the discharge pipes are flushed out, thereby to prevent lime paste from flowing into said pipes when the lime paste is introduced into the vats.

By my invention there is provided simple and efficient apparatus for conducting the lime paste from the several curing vats to the point desired.

It will be understood that the invention is not limited to the specific embodiment shown, and that various deviations may be made therefrom without departing from the spirit and scope of the appended claims.

What is claimed is:—

1. The combination of a plurality of vats adapted to receive lime paste, a union provided with a pair of opposed plates, a valve chamber and tubes extending from said plates to said valve chamber; discharge pipes leading from said vats to said tubes, a delivery pipe communicating with said chamber, a valve mounted in said chamber adjustable to establish communication between any one of the vat pipes and the delivery pipe, and means detachably to connect said discharge pipes with said plates and having provision permitting removal of any one of said discharge pipes without disturbing the other pipes or said union.

2. The combination of vats adapted to receive lime paste, a valve body having a chamber, a pair of opposed plates, a plurality of tubes extending from one of said plates to said chamber and tubes extending from the other plate to said chamber; discharge pipes extending from the vats to the tubes, a delivery pipe communicating with the chamber, a valve mounted in the chamber adjustable to establish communication between any one of the discharge pipes and the delivery pipe, means detachably to connect each of said discharge pipes with its plate, and means detachably to connect said delivery pipe to said body, each of said pipes being detachable from the body without disturbing the body or any of the other pipes.

3. The combination of a plurality of vats adapted to receive lime paste, a valve body, pipes leading from said vats to said valve body, a delivery pipe connected to the valve body, a valve in said body adjustable to establish communication between any one of the vat pipes and the delivery pipe, each of said vat pipes being formed of sections, means detachably to connect the ends of the adjacent pipe sections including opposed flanges threaded to the pipe sections, said opposed flanges having yokes pivotally connected to one and lugs on the other, and screws threaded in the yokes for engagement with the lugs to draw the flanges toward each other, and means detachably to connect the ends of some of said pipe sections with the body including flanges having a sliding fit on the pipe sections, the latter flanges and the body having yokes pivotally connected to one and lugs on the other, and screws threaded in the yokes for engagement with the lugs to draw the flanges toward the body.

4. The combination of a plurality of vats adapted to receive lime paste, a valve body, discharge pipes leading from the vats to the valve body, a pump, a delivery pipe extending from the valve body to the pump, a valve mounted in the body adjustable to establish communication between any one of the vat pipes and the delivery pipe, a pipe connected to the delivery pipe and adapted to conduct water thereto from a source of supply, and valve means for controlling discharge of the water to the delivery pipe, said valve and valve means being adjustable to admit water to any of said discharge pipes and vats, or to the delivery pipe, or to the pump to prime the same.

5. The combination of a plurality of vats for receiving lime paste, conducting means leading from the vats, a pump for drawing the lime paste from the vats through the conducting means, a water supply pipe communicating with the conducting means at a point intermediate the pump and the vats, a valve for opening or closing the water supply pipe, and a valve interposed in the conducting means adjustable to deliver lime paste from any one of the vats through the conducting means or to direct water from the supply pipe through the conducting means to any one of the vats.

6. The combination of a plurality of vats adapted to receive lime paste, a union provided with a conical chamber, ports leading to said chamber and a cover for said chamber; pipes for conducting lime paste from said vats to said ports, a delivery pipe for conducting lime paste from the union, a conical valve plug in said chamber having a passage for establishing communication between any one of said ports and the delivery pipe on rotative adjustment of said valve plug, a stem projecting from the valve plug through a hole in the cover, a boss on the stem having a member adapted to be engaged manually to impart rotative adjustment to the plug valve, and a sleeve loose on the stem, threaded in the hole in the cover and for engagement with the valve plug or with the boss respectively to force the valve plug into or out of said chamber on rotative adjustment of said sleeve.

7. The combination of a plurality of vats adapted to receive lime paste, a valve body, discharge pipes leading from said vats to said valve body, a delivery pipe leading from said valve body, a valve in said body adjustable to establish communication between any one of said discharge pipes and said delivery pipe and having provision for cutting off communication between the other discharge pipes and the delivery pipe, and valves at the entrance ends of said discharge pipes for preventing the lime paste from flowing from the vats into the discharge pipes with the exception of the one in communication with the delivery pipe.

THOMAS J. STURTEVANT.